Sept. 13, 1966  F. PAASCHE  3,272,680
APPARATUS FOR MAKING REINFORCED RUBBER BELTING
Original Filed April 24, 1961  3 Sheets-Sheet 1
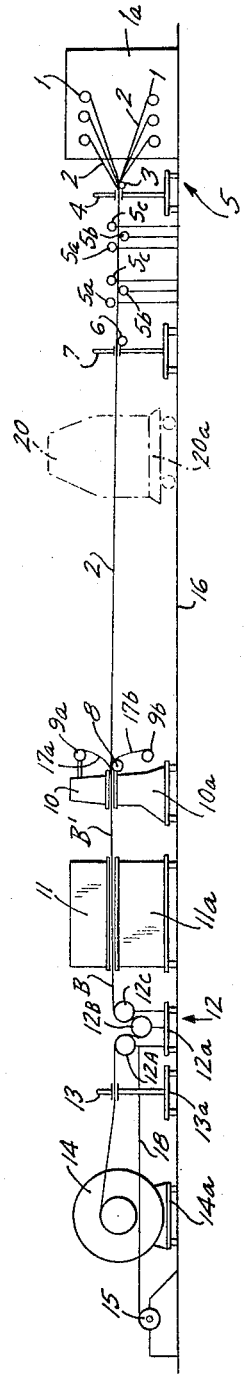
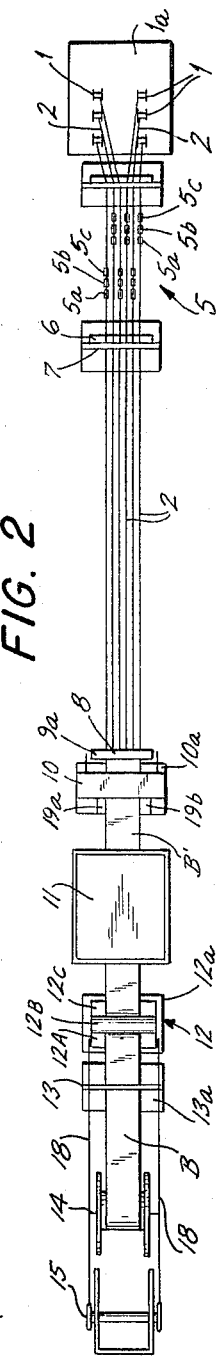
INVENTOR:
FRITZ PAASCHE
BY Michael S. Striker
ATTORNEY Sept. 13, 1966 F. PAASCHE 3,272,680
APPARATUS FOR MAKING REINFORCED RUBBER BELTING
Original Filed April 24, 1961 3 Sheets-Sheet 2

INVENTOR:
FRITZ PAASCHE
BY Michael S. Striker
ATTORNEY

Sept. 13, 1966  F. PAASCHE  3,272,680
APPARATUS FOR MAKING REINFORCED RUBBER BELTING
Original Filed April 24, 1961  3 Sheets-Sheet 3

INVENTOR:
FRITZ PAASCHE
BY Michael S. Striker
ATTORNEY

United States Patent Office 3,272,680
Patented Sept. 13, 1966

3,272,680
APPARATUS FOR MAKING REINFORCED RUBBER BELTING
Fritz Paasche, Cologne-Weidenpesch, Germany, assignor to Franz Clouth Rheinische Gummiwarenfabrik Aktiengesellschaft, Cologne-Nippes, Germany
Original application Apr. 24, 1961, Ser. No. 105,087. Divided and this application Mar. 19, 1965, Ser. No. 443,774
Claims priority, application Germany, April 25, 1960, C 21,294; Feb. 3, 1961, C 23,333
12 Claims. (Cl. 156—494)

The present invention relates to cord construction belting in general, and more particularly to an apparatus for the production of cord construction belting which consists of rubber or a similar rubber material and which comprises longitudinally extending metallic reinforcing wires or cables, hereinafter called cords.

The present application is a division of my copending application Serial No. 105,087, filed April 24, 1961, now abandoned and entitled, "Process and Apparatus for the Production of Reinforced Belting."

An object of the invention is to provide a novel apparatus for the practice of my process which is constructed and assembled in such a way that the tension of each individual cord may be adjusted independently of the other cords and which is capable of coating substantial lengths of reinforcing cords in a continuous operation.

Another object of the invention is to provide an apparatus for the production of belting for use in belt conveyors and the like which may be operated in a fully automatic way, which can be handled by semi-skilled personnel, and which can be conveniently and rapidly adapted for the production of differently dimensioned and differently reinforced belting.

With the above and certain other objects in view, the improved apparatus comprises assembly means including spaced first and second tensioning means for the cords, belt producing means including a coating press which is located between the first and second tensioning means and which not only covers the cords with a layer of rubbery material but preferably also forces the material into the spaces between the adjacent cords. The coating operation may be performed by moving the press longitudinally of the cords or by moving the assembly means and the tensioned cords with respect to the press. The vulcanizing press which forms part of the belt producing means is located between the coating press and one of the tensioning means, and the vulcanized belting is collected by a drum or like take-up means located at one end of the apparatus.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a somewhat schematic side elevational view of an apparatus for the practice of my process;

FIG. 2 is a schematic top plan view of the apparatus;

Figure 3:
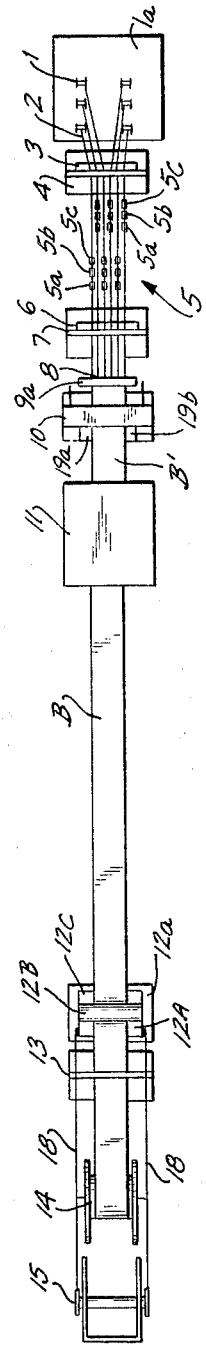
FIG. 3 is a similar top plan view of the apparatus, showing the coating and vulcanizing presses in a different position.
Figure 4:
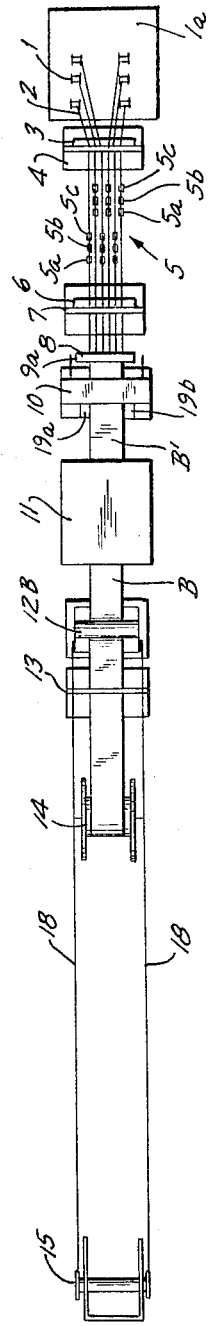
FIG. 4 is a further top plan view of the apparatus with the presses in the position of FIG. 3 and with the collecting drum moved to the right.

Referring now in greater detail to the illustrated embodiments, and first to FIGS. 1 and 2, there is shown an apparatus for the production of cord construction belting which consists of rubber or rubbery synthetic plastic material, and whose reinforcing cords consist of cables or wires 2 made of steel or another metal. For example, the belting may be reinforced by cords having a diameter of about 5 mm. The apparatus comprises a supply or source of cords here shown in the form of reels 1, one for each cord, these reels being disposed at one longitudinal end of the apparatus and being supported on a suitable frame 1a. The axes of the reels 1 are perpendicular to the longitudinal direction of the reinforced belting B which is produced in the apparatus. It is assumed that the belting B comprises only six steel cords 2 which are disposed in a common plane so that they form a single row. Of course, it will be readily understood as this description proceeds that the apparatus may be conveniently adapted for the production of belting comprising a higher number of cords 2 which may be arranged in two or more rows or which may be staggered with respect to each other. The cross-section and the number of cords 2 depends on the required strength characteristics of the belting B, namely, on the intended use of the finished product. In actual manufacture, the belting usually comprises between 50 and 300 cords, depending on the width of the belting, and the cords are preferably closely adjacent to each other and are arranged in a common plane. Owing to such large numbers of cords, the reels 1 are normally staggered in the longitudinal direction of the apparatus and are mounted on their frame at different elevations from the ground.

The cords 2 are led from their respective reels 1 over a grooved spacer roller or comb 3 which is located in advance of a first locking or clamping device in the form of a stationary strainer 4, the latter being assumed to be in open position. After passing through the strainer 4, the cords 2 are led through a tensioning arrangement 5 which comprises a group of tensioning rolls for each cord. Each group comprises three rolls $5a$, $5b$, $5c$ with the outer rolls $5a$, $5c$ fixed and with the median roll $5b$ reciprocable with respect to the rolls $5a$, $5c$ so as to increase the tension of the respective cord when moved upwardly and to relax the tension of the respective cord when moved in downward direction. It will be noted that the groups of tensioning rolls $5a–5c$ for the adjacent cords are staggered with respect to each other. This is often necessary because the cords are closely adjacent to each other.

Rearwardly of the tensioning arrangement 5, there is provided a second locking or clamping means in the form of a stationary strainer 7. This strainer supports a second grooved spacer roller or comb 6 whose function is to insure that the cords 2 remain in predetermined spaced relationship with respect to each other when they pass from the tensioning rolls $5a–5c$ through the slot or gap of the second strainer 7. It is assumed that the strainer 7 is open.

The apparatus further comprises a belt producing, or applicator, means shown in the form of a press 10 which is provided with a wheel-mounted carriage or truck $10a$ and which supports at its front (right-hand) side a third grooved spacer roller or comb 8. The rollers 6 and 8 together constitute means for maintaining a predetermined length of cords 2 in parallelism with each other.

The rubbery layer or coat consists of sections $17a$, $17b$ which are respectively paid out by two supply rollers $9a$, $9b$ mounted on the press 10 so that the row of cords 2 is received between the sections $17a$, $17b$ immediately after the cords pass over the third spacer roller 8. The press 10 transforms the sections $17a$, $17b$ and the row of cords 2 into a preformed or prefabricated belt B' which, if the layers $17a$, $17b$ consist of vulcanizable rubber or rubbery material, thereupon passes through a horizontal vulcanizing press 11 to emerge therefrom in the form of finished belting B. The vulcanizing press 11 also comprises a wheel-mounted carriage or truck 11a which is reciprocable along elongated guideways shown in FIG. 1 as rails 16. The means for moving the presses 10, 11 along the guideways 16 (preferably independently of each other) may comprise suitable motors or the like, not shown.

Rearwardly of the vulcanizing press 11, there is provided a second tensioning arrangement 12 which, in the embodiment of FIGS. 1 to 4, comprises three transversely extending tensioning rollers 12A–12C mounted on a wheel-supported carriage or truck 12a, the latter adapted to travel along the guideways 16. It is assumed that the tensioning arrangement 12 is in operative position in that the median roller 12B is moved downwardly from its normal position with respect to the outer rollers 12A, 12C so that the belting B which passes about and beneath the median roller 12B is subjected to a predetermined tension. The axes of the rollers 12A–12C are perpendicular to the longitudinal direction of the cords 2.

Adjacent to and located past the second tensioning arrangement 12, there is provided a third strainer 13 which is assumed to be closed, that is, in locking position, and which comprises a wheel-mounted carriage or truck 13a. The strainer 13 is preferably coupled with the tensioning arrangement 12 so that they may move in unison along the guideways 16. The provision of the second tensioning arrangement 12 is considered necessary in many instances because the frictional engagement of the strainer 13 with the vulcanized belting B is often insufficient to maintain the belting in properly tensioned condition. Also, the strainer 13 might damage the belting if at least some tensional stresses are not taken up by the tensioning arrangement 12. However, and particularly if the cords 2 are subjected to comparatively small longitudinal tension, the tensioning arrangement 12 may be dispensed with so that the belting B is then tensioned only by the strainer 13. The belting B passing through the gap or slot of the strainer 13 is collected on a take-up means in the form of a take-up drum 14 which comprises a wheel-mounted carriage or truck 14a. The three leftmost wheel-mounted devices 12, 13 and 14 are connected with a reciprocating or moving means here shown as a winch 15 which is stationary and which is located at the rearmost end of the apparatus, namely, at the left-hand end of the guideways 16, as viewed in FIG. 1. The connection between the winch 15 and the devices 12, 13, 14 comprises one or more cables or chains 18.

The production of belting B is carried out in the following manner:

The strainer 4 is closed to firmly clamp and to lock the cords 2, and the winch 15 is operated to move the devices 12, 13, 14 in a direction to the left through a distance necessary to subject a predetermined length of cords 2 to a given tension. The tensioning arrangement 12 is operative and the strainer 13 is closed. In the next step, the median rolls 5b of the tensioning arrangement 5 are moved in upward direction to the extent necessary to insure that each cord 2 is subjected to a predetermined (preferably uniform) tension. As shown in FIG. 1, the cords pass beneath the outer tensioning rolls 5a, 5c but above the median tensioning rolls 5b. When the cords are subjected to a preselected tension, the operator causes the strainer 7 to engage the row of cords and to prevent any changes in tension during the ensuing stages of the operation. The press 10 is then moved in a direction to the right (see FIG. 3) toward and into close proximity of the strainer 7. This results in the formation of a prefabricated belt B' which is formed at the same rate of speed at which the press 10 is moved to the right. The belt B' extends between the presses 10, 11. The press 10 comprises cutting means 19a, 19b for trimming the longitudinal edges of the prefabricated belt B' as the press 10 moves intermittently toward the strainer 7 so that the prefabricated belt at the left-hand side of the press is of uniform width. The vulcanizing press 11 follows the rightward movement of the press 10 but it need not be connected therewith, and vulcanizes the belt B' to transform the same into finished belting B.

When the press 10 is moved all the way to the right and into close proximity of the strainer 7 to assume the position of FIG. 3, the tensioning arrangement 12 is operated by moving the median roller 12B in downward direction and by unlocking the outer rollers 12A, 12C so that the outer tensioning rollers are free to rotate. The strainer 13 is opened and the devices 12, 13, 14 are moved to the right (see FIG. 4) whereby the take-up drum 14 collects the belting B as it moves in a direction toward the vulcanizing press 11. In the next step, the operator releases the tensioning rolls 5b, and opens the strainers 4, 7 so that predetermined lengths of cords 2 may be paid out by the respective reels 1.

In order to unwind a second predetermined length of cords from the reels 1, the operator again locks the outer tensioning rollers 12A, 12C by applying suitable brakes, not shown, and moves the median tensioning roller 12B to its tensioning position. The operator then closes the strainer 13 by making sure that the row of cords is located exactly midway between the guideways 16. If the winch 15 is then operated in a direction that the cables 18 move the devices 12, 13, 14 to the left, and if the presses 10, 11 are also moved to the left, that is, substantially to the position of FIG. 1, a preselected new length of cords 2 extending between the press 10 and the strainer 7 is ready for coating and, if necessary, vulcanizing. The operation is then repeated by closing the strainer 7, by moving the tensioning arrangement 12 slightly to the left to subject the cords to a given tension, by operating the tensioning rolls 5b in a sense to equalize or to otherwise precisely adjust the tension of the individual cords, by moving the press 10 and the vulcanizing press 11 to the right, and so forth.

If desired, the apparatus may comprise a device 20 mounted on a wheel-supported carriage 20a which is placed between the press 10 and the strainer 7 to apply to the cords 2 a suitable adhesive before the cords are received between the sections 17a, 17b of the rubber or rubber-like layer. This adhesive applying device 20 is an optional feature of my apparatus and is shown in phantom lines in FIG. 1.

The means for cooling the vulcanized layer 17a, 17b of a vulcanizable rubber or rubbery material may be installed directly in the vulcanizing press 11 so that the finished belting B is cooled automatically as the press 11 moves toward the strainer 7.

When the apparatus is to begin with the production of a new belting, all wheel-mounted devices (namely, the device 10, 11, 12, 13 and 14) are moved as far to the right as possible. A draw wire (not shown) which is formed with loops and which is connected with the take-up drum 14 is then led through the strainer 13, through the tensioning arrangement 12 and through the presses 11, 10 to be connected with the forward ends of the cords which are assumed to extend through the slot or slots of the strainer 7. The tensioning arrangement 12 and the strainer 13 are then moved to their operative positions to firmly engage the draw wire, and the devices 10–14 are moved to the left, as viewed in FIGS. 1 and 2, to unwind predetermined lengths of cords 2 from the respective reels 1 and to provide room for movement of the press 10 in a direction toward the strainer 7. The coating step (and eventually the vulcanizing step) is then carried out in a manner as described above.

The advantage of the press 10 is that it forces the material of the layer 17a, 17b between the adjacent cords 2 and completely embeds the cords in the rubber-like material. Furthermore, since the press 10 subjects the layer 17a, 17b to a preliminary compression, the pressures prevailing in the vulcanizing press cannot displace the cords with respect to each other whereby the press 10 insures that the cords remain in parallelism with each other.

The press 10 is usually operated at a temperature of about 50° C. and at a pressure of between 20–60 atmospheres absolute pressure. Such pressures insure that the material of the layer 17a, 17b is forced into and fills the spaces between the adjacent cords, but no vulcanization takes place. The exact pressure depends on the diameters of the cords 2. The vulcanizing press 11 is usually operated at a temperature of about 140° C. and at a pressure of about 20 atmospheres absolute pressure.

Figure 5:
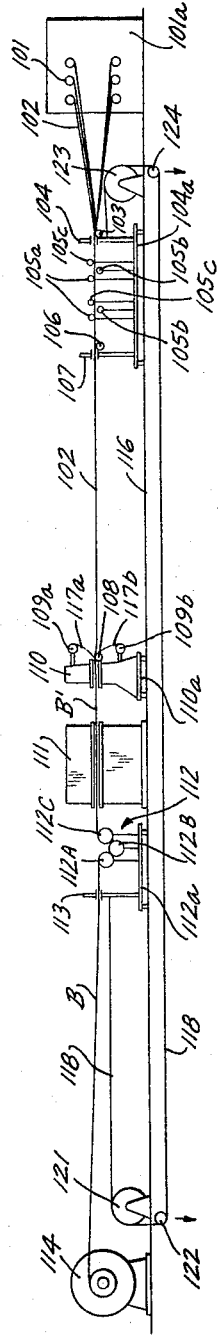
FIG. 5 is a schematic side elevational view of a modified apparatus.
Figure 6:
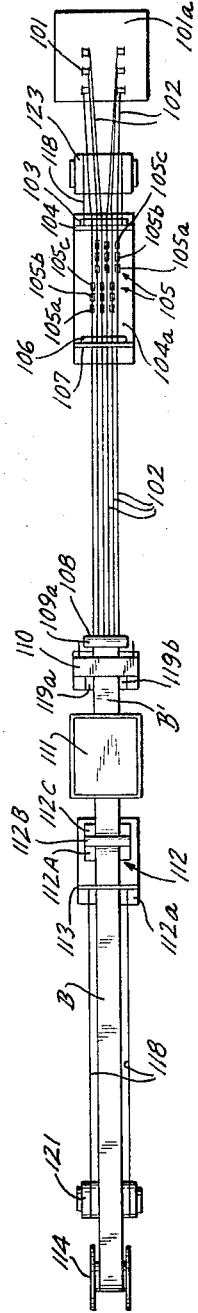
FIG. 6 is a schematic top plan view of the modified apparatus.

Referring to FIGS. 5 and 6, there is shown a modified apparatus wherein all parts analogous to or identical with those described in connection with FIGS. 1 to 4 are identified by similar reference characters each preceded by the numeral 1.

The strainer 104 is assumed to be open and the tensioning rolls 105a–105c permit the cords 102 to extend freely to and through the open strainer 107. The strainers 104, 107, the rollers 103, 106 and the tensioning arrangement 105 are mounted on a common wheel-supported carriage 104a for movement along the guideways 116. The reels 101 for the cords 102 are mounted in a stationary frame 101a.

The press 110 is movable between the carriage 104a and a stationary vulcanizing press 111. The tensioning arrangement 112 is assumed to be in locking or belting-engaging position and cooperates with the momentarily closed strainer 113 to hold the belting B against movement. The belting B extends toward and is collected on the drum 114. The tensioning arrangement 112 and the strainer 113 are mounted on a common wheel-supported carriage 112a for travel along the guideways 116. The means for moving the carriages 104a, 112a along the guideways 116 comprises stationary pulleys 121, 123, deflecting rollers 122, 124, and cables or chains 118. The ends of the cables 118 are connected with the carriages 104a, 112a, respectively, and pass about the pulley 123, about the roller 124, about the roller 122 and about the pulley 121 in that order.

The apparatus of FIGS. 5 and 6 is operated as follows:

The strainer 104 is closed and the cables 118 are tensioned, e.g. by moving the rollers 122, 124 in downward direction to move the carriage 112a to the left and to move the carriage 104a to the right whereby the cords 102 are subjected to a given tension which is thereupon equalized or otherwise adjusted with great precision by the tensioning arrangement 105, namely by the rolls 105b which move upwardly and engage the respective cords. The strainer 107 is then closed and the press 110 is moved to the right to cover the cords with a layer consisting of rubbery sections 117a, 117b and to thereby form a prefabricated flexible belt B' which extends between the vulcanizing press 111 and the left-hand side of the press 110. As explained in connection with FIG. 1, the press 110 preferably comprises means 119a, 119b for trimming the edges of the prefabricated belt B' so that the latter is of uniform width.

In the next step, the press 110 is returned to the position of FIGS. 5 and 6 and the pulley 121 is thereupon rotated in anticlockwise direction to advance the prefabricated belt B' through the stationary vulcanizing press 111 and to transform the belt B' into finished belting B which is simultaneously collected on the drum 114. Since the strainers 107, 113 and the tensioning arrangements 105, 112 clamp the belting and the cords, the carriage 104a is compelled to move toward the press 110.

When the carriage 104a is moved all the way to the press 110, the operator releases the tensioning arrangements 105, 112 and opens the strainers 104, 107, 113 so that the carriages 104a, 112a may be moved to the right, that is, back to the position shown in FIGS. 5 and 6. During such movement of the carriages, the cords 102 remain stationary because the strainers are open and because the tensioning arrangements are idle. The operation is then repeated by closing the strainers, by moving the tensioning rollers 112B away from the rollers 112A, 112C and into firm engagement with the belting B, by moving the carriage 112a through a short distance to the left so as to subject the cords to a given tension, by moving the tensioning rolls 105b into tension-adjusting engagement with the cords, by moving the press 110 to the right, by subsequently returning the press 110 to the left, and by moving the carriages 104a, 112a to the left in order to advance the newly formed prefabricated belt B' through the vulcanizing press 111.

It will be readily understood that the press 110 may remain stationary and that the cords 102 may be advanced intermittently with respect to the press 110 so that the coating and vulcanizing operations are carried out in a simultaneous step. It is equally possible to replace the cables 118 by a rigid frame which connects the carriages 104a, 112a for movement along the guideways 116.

The important difference between the apparatus of FIGS. 1–4 and 5–6 is that the apparatus of FIGS. 1–4 comprises a reciprocable vulcanizing press 11 whereas the apparatus of FIGS. 5–6 comprises two tensioning arrangements 105, 112 which are reciprocable with respect to the stationary vulcanizing press 111. In other words, the press 11 moves with respect to stationary cords 2 to complete a vulcanizing operation, whereas the arrangements 105, 112 move a preselected length of cords 102 through the stationary press 111.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for the production of belting consisting of vulcanizable rubbery material which is reinforced by metallic cords, said apparatus comprising, in combination, elongated guideways having a first and a second end, a source of cords provided at said first end; take-up means for the belting mounted for movement along said guideways toward and away from said source; first tensioning means for the cords provided between said take-up means and said source and adjacent to said source; second tensioning means provided between said first tensioning means and said take-up means and movable along said guideways toward and away from said first tensioning means, said first and second tensioning means adapted to tension the cords and said first tensioning means comprising means for individually tensioning the cords so as to subject the cords to requisite tension; at least one grooved member provided between said first and second tensioning means for maintaining the cords in parallelism with each other; applicator means movable along said guideways and located between said first and second tensioning means for applying rubbery material to the cords when moving in a direction toward said first tensioning means so as to produce a prefabricated belt while the cords remain under tension; and vulcanizing means reciprocable along said guideways between said second tensioning means and said applicator means for vulcanizing the rubbery material on the cords when moved toward said first tensioning means so as to produce a finished belting while the cords remain under tension, the finished belting passing through said second tensioning means and to said take-up means.

2. An apparatus for the production of belting consisting of vulcanizable rubbery material which is reinforced by metallic cords, said apparatus comprising, in combination, elongated guideways having a first and a second end, a source of cords provided at said first end; take-up means for the belting mounted for movement along said guideways toward and away from said source; first tensioning means for the cords provided between said take-up means and said source and adjacent to said source; second tensioning means provided between said first tensioning means and said take-up means and movable along said guideways toward and away from said first tensioning means, said first and second tensioning means adapted to tension the cords and said first tensioning means comprising means for individually tensioning the cords so as to subject the cords to requisite tension; at least one grooved member provided between said first and second tensioning means for maintaining the cords in parallelism with each other; applicator means movable along said guideways and located between said first and second tensioning means for applying rubbery material to the cords when moving in a direction toward said first tensioning means so as to produce a prefabricated belt while the cords remain under tension; vulcanizing means reciprocable along said guideways between said second tensioning means and said applicator means for vulcanizing the rubbery material on the cords when moved toward said first tensioning means so as to transform the prefabricated belting into a finished belting, while the cords remain under tension, the finished belting passing through said second tensioning means and to said take-up means; and strainer means provided between said take-up means and said second tensioning means for releasably clamping the finished belting.

3. An apparatus for the production of belting consisting of vulcanizable rubbery material which is reinforced by metallic cords, said apparatus comprising, in combination, elongated guideways having a first and a second end, a source of cords provided at said first end; take-up means for the belting mounted for movement along said guideways toward and away from said source; first tensioning means for the cords provided between said take-up means and said source and adjacent to said source; second tensioning means provided between said first tensioning means and said take-up means and movable along said guideways toward and away from said first tensioning means, said first and second tensioning means adapted to tension the cords and said first tensioning means comprising means for individually tensioning the cords so as to subject the cords to requisite tension; at least one grooved member provided between said first and second tensioning means for maintaining the cords in parallelism with each other; applicator means movable along said guideways and located between said first and second tensioning means for applying rubbery material to the cords when moving in a direction toward said first tensioning means so as to produce a prefabricated belt while the cords remain under tension, said applicator means comprising means for trimming the longitudinal edges of the prefabricated belt; and vulcanizing means reciprocable along said guideways between said second tensioning means and said applicator means for vulcanizing the material on the cords when moved toward said first tensioning means so as to produce a finished belting while the cords remain under tension, the finished belting passing through said second tensioning means and to said take-up means.

4. An apparatus for the production of belting consisting of vulcanizable rubbery material which is reinforced by metallic cords, said apparatus comprising, in combination, elongated guideways having a first and a second end, a source of cords provided at the first end of said guideways; take-up means for the belting mounted for movement along said guideways toward and away from said source; first tensioning means for the cords provided between said take-up means and said source and adjacent to said source, said first tensioning means comprising two spaced groups of rolls and each group comprising two outer rolls and a median roll for each cord, said median rolls movable with respect to said outer rolls for thereby varying the tension of the respective cords; second tensioning means provided between said first tensioning means and said take-up means and movable along said guideways toward and away from said first tensioning means, said first and second tensioning means adapted to tension the cords and said first tensioning means comprising means for individually tensioning the cords so as to subject the cords to requisite tension; at least one grooved member provided between said first and second tensioning means for maintaining the cords in parallelism with each other; applicator means movable along said guideways and located between said first and second tensioning means for applying rubbery material to the cords when moving in a direction toward said first tensioning means so as to produce a prefabricated belt while the cords remain under tension; and vulcanizing means reciprocable along said guideways between said second tensioning means and said applicator means for vulcanizing the material on the cords when moved toward said first tensioning means so as to produce a finished belting while the cords remain under tension, the finished belting passing through said second tensioning means and to said take-up means.

5. An apparatus for the production of belting consisting of vulcanizable rubbery material which is reinforced by metallic cords, said apparatus comprising, in combination, elongated guideways having a first and a second end, a source of cords provided at said first end; take-up means for the belting mounted for movement along said guideways toward and away from said source; first tensioning means for the cords provided between said take-up means and said source and adjacent to said source; second tensioning means provided between said first tensioning means and said take-up means and movable along said guideways toward and away from said first tensioning means, said first and second tensioning means adapted to tension the cords and said first tensioning means comprising means for individually tensioning the cords so as to subject the cords to requisite tension; at least one grooved member provided between said first and second tensioning means for maintaining the cords in parallelism with each other; applicator means movable along said guideways and located between said first and second tensioning means for applying rubbery material to the cords when moving in a direction toward said first tensioning means so as to produce a prefabricated belt while the cords remain under tension; vulcanizing means reciprocable along said guideways between said second tensioning means and said applicator means for vulcanizing the material on the cords when moved toward said first tensioning means so as to produce a finished belting while the cords remain under tension, the finished belting passing through said second tensioning means and to said collecting means; and means for reciprocating said applicator means, said vulcanizing means, said second tensioning means and said take-up means along said guideways.

6. An apparatus for the production of belting consisting of vulcanizable rubbery material which is reinforced by metallic cords, said apparatus comprising, in combination, elongated guideways having a first and a second end, a source of cords provided at said first end; take-up means for the belting mounted for movement along said guideways toward and away from said source; first tensioning means for the cords provided between said take-up means and said source and adjacent to said source; second tensioning means provided between said first tensioning means and said take-up means and movable along said guideways toward and away from said first tensioning means, said first and second tensioning means adapted to tension the cords and said first tensioning means comprising means for individually tensioning the cords so as to subject the cords to requisite tension; at least one grooved member provided between said first and second tensioning means for maintaining the cords in parallelism with each other; means reciprocable along said guideways between said first and second tensioning means for applying a layer of adhesive to the cords; applicator means movable along said guideways and located between said second tensioning means and said adhesive applying means for applying rubbery material to the cords with rubbery material when moving in a direction toward said first tensioning means so as to produce a prefabricated belt while the cords remain under tension; and vulcanizing means reciprocable along said guideways between said second tensioning means and said applicator means for vulcanizing the material on the cords when moved toward said first tensioning means so as to produce a finished belting while the cords remain under tension, the finished belting passing through said second tensioning means and to said take-up means.

7. An apparatus for the production of belting consisting of vulcanizable rubbery material which is reinforced by metallic cords, said apparatus comprising, in combination, spaced first and second tensioning means for tensioning the cords and for subjecting the cords to identical tension; means for maintaining the cords in parallelism with each other; means reciprocable between said first and second tensioning means for applying rubbery material to the cords while the cords remain under tension; and vulcanizing means reciprocable between said applicator means and one of said tensioning means for vulcanizing the rubbery material while the cords remain under tension.

8. An apparatus for the production of belting consisting of vulcanizable rubbery material which is reinforced by metallic cords, said apparatus comprising, in combination, spaced first and second tensioning means for tensioning the cords and for subjecting the cords to identical tension; means for maintaining the cords in parallelism with each other; adhesive applying means reciprocable between said first and second tensioning means for applying a layer of adhesive to the cords while the cords remain under tension; means reciprocable between said adhesive applying means and one of said tensioning means for applying rubbery material to the cords while the cords remain under tension; and vulcanizing means reciprocable between said applicator means and said one tensioning means for vulcanizing the rubbery material while the cords remain under tension.

9. An apparatus for the production of belting consisting of vulcanizable rubbery material which is reinforced by metallic cords, said apparatus comprising, in combination, a source of cords; first tensioning means provided in the proximity of said source; second tensioning means more distant from said source than said first tensioning means and reciprocable in directions toward and from said first tensioning means, said first and second tensioning means adapted to tension the cords and said first tensioning means comprising means for adjusting the tension of the cords; means provided intermediate said first and second tensioning means for maintaining the cords in parallelism with each other; means reciprocable between said first and second tensioning means for applying rubbery material to the cords while moving in a direction from said second tensioning means toward said first tensioning means while the cords remain under tension; and vulcanizing means, reciprocable between said coating means and said second tensioning means for vulcanizing the rubbery material while moving in a direction from said second tensioning means toward said first tensioning means and while the cords remain under tension.

10. An apparatus for the production of belting consisting of vulcanizable rubbery material which is reinforced by metallic cords, said apparatus comprising, in combination, a source of cords; first tensioning means provided in the proximity of said source; second tensioning means more distant from said source than said first tensioning means and reciprocable in directions toward and away from said first tensioning means, said second tensioning means comprising a pair of outer tensioning rollers and a median roller movable with respect to said outer rollers for alternately relaxing and increasing the tension of the cords, said rollers having axes perpendicular to the longitudinal direction of the cords, said first and second tensioning means adapted to tension the cords so that the cords are stretched and said first tensioning means comprising means for adjusting the tension of the cords; means provided intermediate said first and second tensioning means for maintaining the cords in parallelism with each other; means reciprocable between said first and second tensioning means for applying rubbery material to the stretched cords while moving in a direction from said second tensioning means toward said first tensioning means while the cords remain under tension; and vulcanizing means reciprocable between said applicator means and said second tensioning means for vulcanizing the rubbery material while moving in a direction from said second tensioning means toward said first tensioning means and while the cords remain under tension.

11. An apparatus for the production of belting consisting of vulcanizable rubbery material which is reinforced by metallic cords, said apparatus comprising, in combination, a source of cords; first tensioning means provided in the proximity of said source; second tensioning means more distant from said source than said first tensioning means and reciprocable in directions toward and from said first tensioning means, said first and second tensioning means adapted to tension the cords so that the cords are stretched and said first tensioning means comprising means for adjusting the tension of the cords; means reciprocable between said first and second tensioning means for applying rubbery material to the cords while moving in a direction from said second tensioning means toward said first tensioning means and while the cords remain under tension; at least one first grooved roller means provided adjacent to said first tensioning means and second grooved roller means connected with said applicator means for maintaining the cords in parallelism with each other; and vulcanizing means reciprocable between said applicator means and said second tensioning means for vulcanizing the rubbery material while moving in a direction from said second tensioning means toward said first tensioning means and while the cords remain under tension.

12. An apparatus for the production of belting consisting of vulcanizable rubbery material and of reinforcing cords in the rubbery material, said apparatus comprising, in combination, a pair of spaced tensioning arrangements adapted to maintain a plurality of reinforcing cords under tension so that the cords are parallel with each other; belt producing means adapted to continuously furnish and to apply to the tensioned cords a rubbery material and to thereby form a belting upon application of rubbery material to the cords while the cords remains under tension, said belt producing means comprising means for vulcanizing the rubbery material while the cords remain under tension; and means for moving said tensioning arrangements with respect to said belt producing means in the longitudinal direction of the cords while the rubbery material is continuously furnished and applied to the cords and while the rubbery material already applied to the cords is continuously vulcanized.

References Cited by the Examiner

UNITED STATES PATENTS

| | | | |
|---|---|---|---|
| 1,129,084 | 2/1915 | Gammeter | 156—143 |
| 1,370,597 | 3/1921 | Lambert | 156—161 |
| 1,911,185 | 5/1933 | Gates | 156—510 XR |
| 2,740,459 | 3/1956 | Kilborn et al. | 145—494 XR |
| 3,083,130 | 3/1963 | Strandquist | 156—143 |

EARL M. BELGERT, *Primary Examiner.*

P. DIER, *Assistant Examiner.*